United States Patent [19]
Meuche

[11] Patent Number: 5,302,283
[45] Date of Patent: Apr. 12, 1994

[54] LEAF GUARD AND STRAINER ASSEMBLY FOR A GUTTER DOWNSPOUT

[76] Inventor: Howard O. Meuche, R.R. 1 Box 273, Fort Branch, Ind. 47648

[21] Appl. No.: 106,856

[22] Filed: Aug. 16, 1993

[51] Int. Cl.⁵ .............................................. B01D 35/02
[52] U.S. Cl. .................................. 210/162; 210/463; 210/474; 52/12
[58] Field of Search ............... 210/162, 459, 460, 463, 210/473, 474; 52/12

[56] References Cited

U.S. PATENT DOCUMENTS

| | | | |
|---|---|---|---|
| 571,711 | 11/1896 | Twist | 210/162 |
| 1,721,472 | 7/1929 | Rose | 210/463 |
| 1,811,728 | 6/1931 | McKee | 210/463 |
| 2,059,071 | 10/1936 | Weyand | 210/463 |
| 2,070,500 | 2/1937 | Wahl | 210/463 |
| 2,360,793 | 10/1944 | Rachlin | 210/463 |
| 2,640,593 | 6/1953 | Korb | 210/463 |
| 2,669,197 | 2/1954 | Van Duzer | 210/463 |
| 3,121,684 | 2/1964 | Bugbird | 210/474 |
| 4,247,397 | 1/1981 | Dobosi | 210/474 |
| 4,285,812 | 8/1981 | Stoltz | 210/162 |

Primary Examiner—Peter A. Hruskoci
Assistant Examiner—Robert James Popovics
Attorney, Agent, or Firm—Maurice L. Miller, Jr.

[57] ABSTRACT

A leaf guard and strainer assembly for use in the downspout of a roof gutter is disclosed which tends to prevent the downspout from being clogged with leaves and debris while permitting water in the gutter to flow around the sides of the assembly and around the sides of a barrier of leaves and debris piled against the assembly so as to enter the downspout from the sides of the assembly which face the opposing gutter sidewalls. The assembly includes a base plate containing an opening adapted to fit upon the gutter floor over an entrance to the downspout so that the opening and entrance communicate. Also included is a plurality of U-shaped ribs, the legs of which are inserted downwardly through the plate on opposite sides of the opening, lower free end portions of which project below the plate into the downspout. An elongated rigid beam member is connected to the upper ends of the ribs to maintain the desired spacing between them. The ribs extend across the gutter between opposing sidewalls thereof to form a barrier to the movement of leaves and other debris longitudinally through the gutter and into the downspout to prevent clogging of the downspout.

9 Claims, 3 Drawing Sheets

LEAF GUARD AND STRAINER ASSEMBLY FOR A GUTTER DOWNSPOUT

BACKGROUND OF THE INVENTION

This invention relates to a leaf guard and strainer assembly adapted for insertion into the upper end of a gutter downspout to barricade the downspout against the introduction of leaves and other debris therein while permitting snow melt, rain water and other liquids to drain from the gutter into the downspout.

Broadly speaking, such assemblies in various forms have long been known and used in the prior art. See, for example, the various devices disclosed in the following patents: U.S. Pat. No. 4,285,812 issued to R. J. Stoltz on Aug. 25, 1981; U.S. Pat. No. 3,121,684 issued to H. C. Bugbird on Feb. 18, 1964; U.S. Pat. No. 2,669,197 issued to T. Van Duzer on Feb. 16, 1954; U.S. Pat. No. 2,640,593 issued to H. C. Korb on Jun. 2, 1953; U.S. Pat. No. 2,360,793 issued to M. Rachlin on Oct. 17, 1944; U.S. Pat. No. 2,070,500 issued to A. S. Wahl on Feb. 9, 1937; U.S. Pat. No. 2,059,071 issued to C. L. Weyand on Oct. 27, 1936; and U.S. Pat. No. 1,811,728 issued to R. Mc Kee on Jun. 23, 1931.

All of these prior art assemblies feature a wire frame leaf cage for preventing leaves and debris from entering and clogging a gutter downspout. The wires or straps which form the frames in each case are spaced apart to allow water to pass through the cage into downspout. The wires are also arranged in either a cylindrical or cone shaped configuration so as to insert into the downspout opening in the floor of a gutter and so as to form a barricade against the flow of leaves and debris into the downspout from all directions around the downspout opening.

The single exception to the previously described construction is the gutter strainer shown in the patent to Van Duzer which is constructed of a wire mesh. This strainer features an elongated mesh sheet placed on a slope on a gutter floor extending in one direction away from a downspout opening which is located near the end of a gutter trough. A second feature of this strainer is a bendable, meshed rectangular strainer plate attached to one end of the elongated sheet which may be bent and inserted as a leaf trap and water strainer within the downspout entrance itself It is said that leaves and other debris will be carried by water in the gutter onto the lower end of the elongated member where debris accumulation will occur along its sloping surface away from the downspout entrance.

Unfortunately, in all of the previously cited examples, leaves and other debris can eventually accumulate completely around the downspout opening to such an extent as to effectively block the flow of water into the downspout and thus cause water to overflow the outer gutter wall. By means of my invention, these and other difficulties encountered using prior art gutter downspout strainers and leaf guards are substantially overcome.

SUMMARY OF THE INVENTION

It is an object of my invention to provide a leaf guard and strainer assembly for disposition in the entrance to a drain pipe, gutter downspout and the like.

It is a further object of my invention to provide a leaf guard and strainer assembly for a gutter downspout which provides an effective barricade against clogging of the downspout with leaves and debris while continuing to provide means for the flow of water from the gutter through the assembly and into the downspout.

Briefly, in accordance with my invention, there is provided a leaf guard and strainer assembly for a gutter downspout. The assembly includes a base plate which contains an opening therein, the base plate being adapted for disposition on the floor of a gutter over an entrance to a downspout such that the opening registers with the entrance. Also included is a plurality of spaced apart, generally U-shaped ribs, each of which ribs has a pair of legs inserted through edge portions of the base plate on opposite sides of the opening. Lower free end portions of the legs which project below the base plate are insertable into the entrance on opposite interior sides of the downspout such that planes containing each of the ribs face opposing sidewalls of the gutter. A rigid beam member is also included which is connected to upper apex portions of the ribs for maintaining a selected spacing between the ribs. One end of the beam is adapted to insert immediately under an inwardly projecting lip of an outer wall of the gutter and the member extends between opposing gutter sidewalls.

These and other objects, features and advantages of my invention will become apparent to those skilled in the art from the following detailed description and attached drawings upon which, by way of example, only a preferred embodiment of my invention is described and illustrated.

DESCRIPTION OF THE PREFERRED EMBODIMENT

Figure 1:
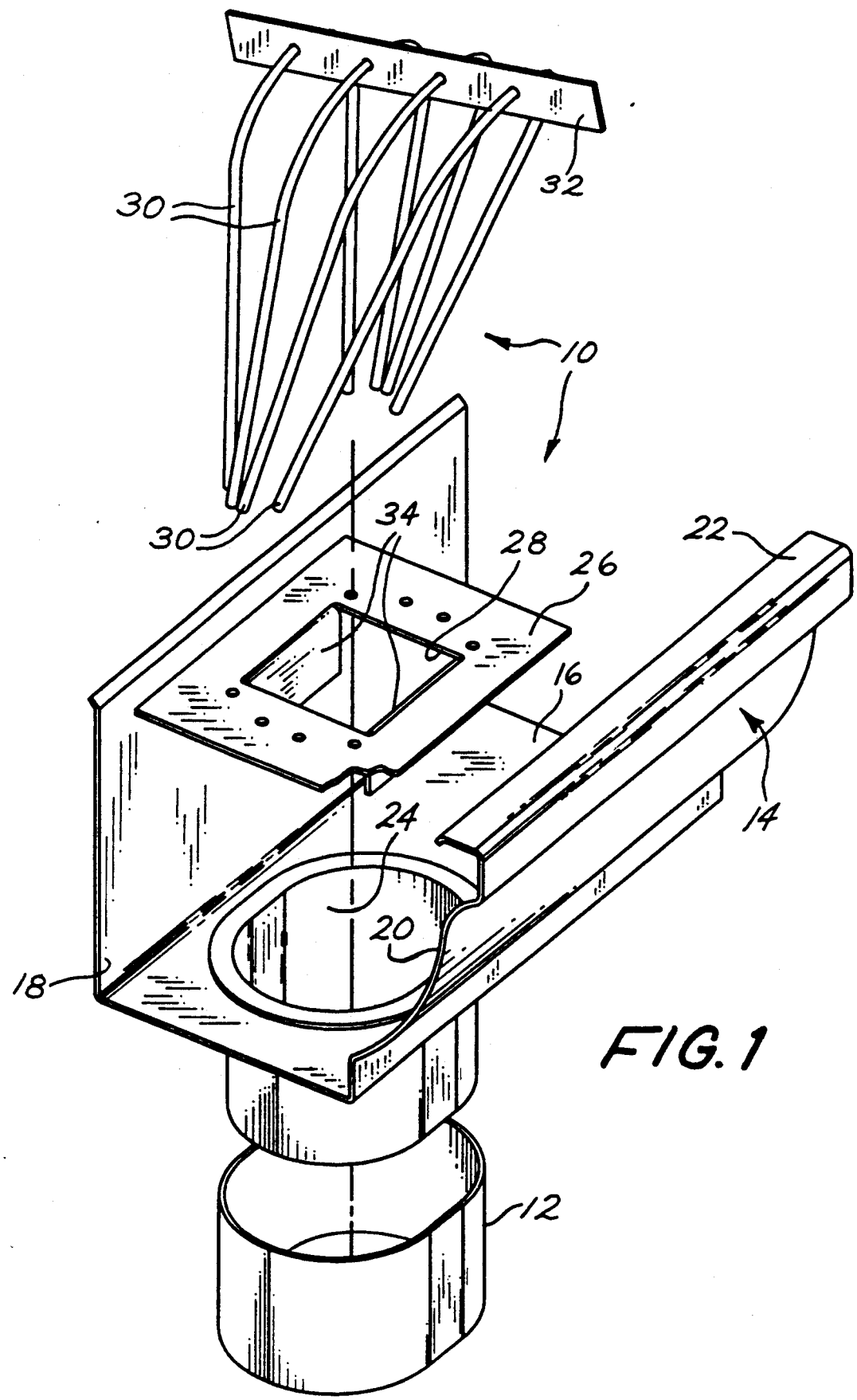
FIG. 1 shows an exploded perspective view of a leaf guard and strainer assembly for a gutter downspout, thus illustrating a preferred embodiment of my invention.

Referring now to the drawing FIGS. 1–4 there is shown, in a preferred embodiment of my invention, a novel leaf guard and/or strainer assembly, generally designated 10, for a drain pipe or downspout 12 such as is normally employed with a conventional eaves trough or gutter 14 of a house or building having a pitched roof. The gutter 14 includes a floor 16, a flat inner sidewall 18 secured along an eave of the pitched roof, and an outwardly bowed outer sidewall 20 containing an inwardly projecting flange or lip 22. Ends of the gutter 14 are enclosed to form a trough and the floor 16 contains an opening located near one or both ends of the trough which serves as an entrance 24 to the downspout 12.

Figure 2:
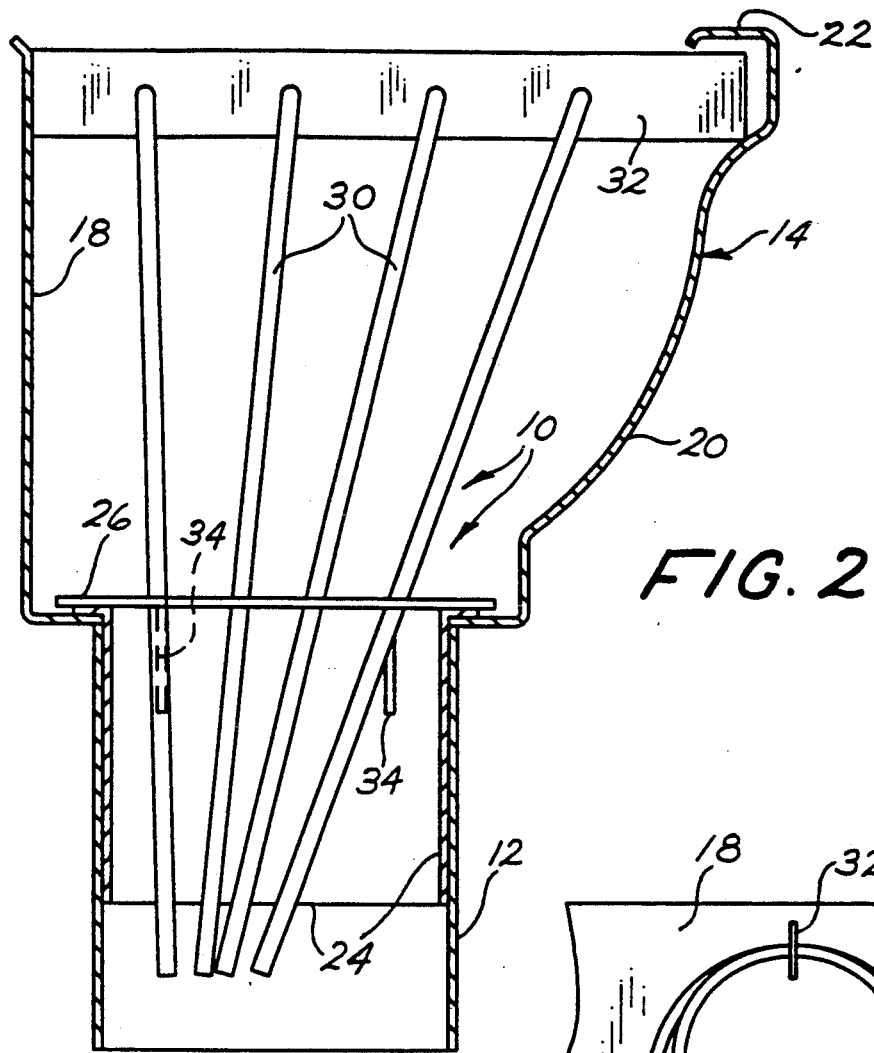
FIG. 2 shows a cross-sectional side elevation view of the assembled leaf guard and strainer and gutter downspout of FIG. 1 with the leaf guard assembly in its operative position.
Figure 3:
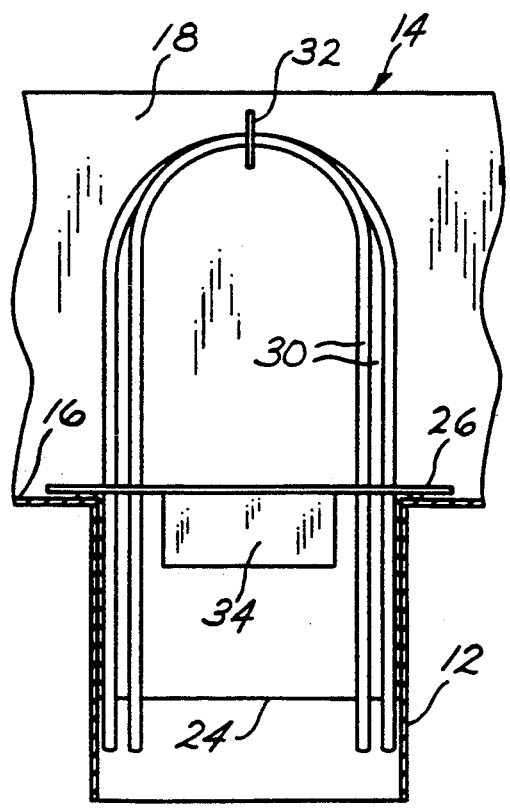
FIG. 3 shows a cross-sectional end elevation view of the gutter and downspout assembly of FIGS. 1–2 with the leaf guard of those figures shown in full in its operative position.
Figure 4:
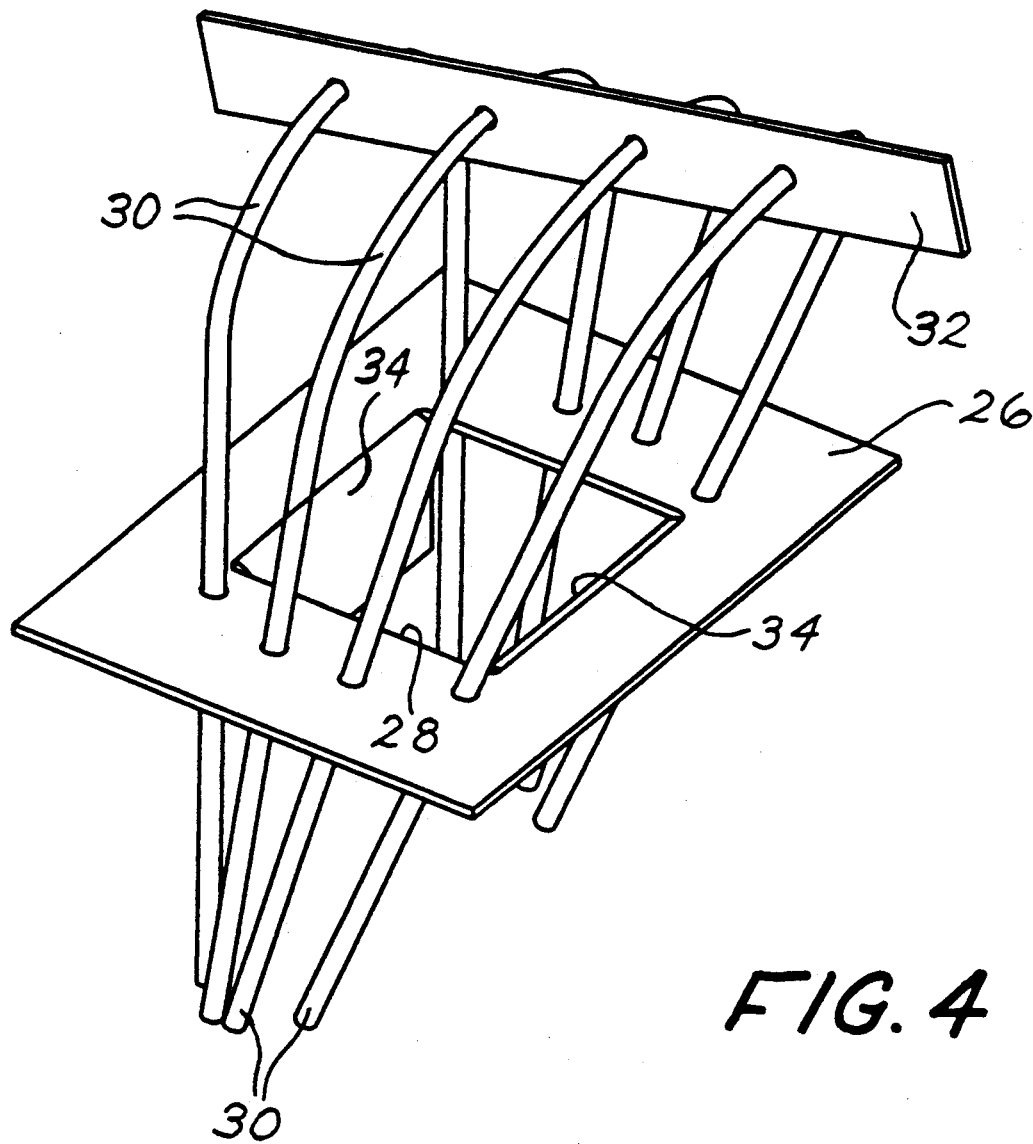
FIG. 4 shows a perspective view of a drain plate used in the assembly of FIGS. 1–4.

The assembly 10 of the present example includes a relatively flat base plate 26, which is preferably rectangularly shaped, and which contains a rectangularly shaped opening 28 therein, a plurality of four spaced apart, generally U-shaped ribs 30, and a rigid beam member 32. Each of the ribs 30 include a pair of legs which are inserted through edge portions of the plate 26 on opposite sides of the opening 28. The base plate 26 contains a pair of flaps 34 which extend downwardly, as viewed, from opposite sides of the opening 28 and project downwardly into the downspout entrance 24 when the plate 26 is placed flush on the gutter floor 16 over the entrance as shown in FIGS. 2-3. The flaps 34 may be positioned to press against the opposite interior sidewalls of the entrance 24 to aid in securing the opening 28 more or less centered over the downspout entrance 24. Lower free end portions of the legs 30 which project below the base plate 26 also project downwardly into the entrance 24 below the flaps 34 as best seen in FIG. 3.

Upper apex portions of the ribs 30 are inserted through aligned, spaced apart holes in the beam member 32 so that the desired spacing of the ribs 30 will be maintained. One end of the beam member 32 fits immediately under the lip 22 of the outer wall 20 and the member 32 extends between the inner and outer gutter walls 18 and 20 over the downspout entrance 24 when the plate 26 is mounted flush against the floor 16 with the opening 28 in registry with the entrance. See FIG. 2. In the operative position of the leaf guard 10, the legs of the ribs 30 located above the plate 26 form a barrier against the flow of leaves and other debris longitudinally of the gutter trough into the downspout entrance 24. But as such leaves and debris pile up against the ribs 30, the sides of the rib assembly opposite to and facing the inner and outer gutter walls 18 and 20 remain relatively open (See FIG. 3) to permit water in the gutter 14 to flow around the sides of the biomass barrier and into the downspout entrance 24 between the legs of the outermost ones of the ribs 30. In this way, the assembly 10 of my invention continues to allow water to drain from the gutter 14 much more readily than is the case with conventional strainers even where leaves and debris are relatively heavily accumulated against the legs of the ribs 30. Even so, the assembly provides a barricade against leaves and debris clogging the downspout 12. While I use four such ribs 30 in my preferred embodiment of the invention, it will be appreciated that any number of individual ribs may be used in the assembly so long as a reasonable leaf and debris barricade can be formed across the rib legs and as long as the outermost ribs in the assembly are relatively close to the opposing gutter side walls. It is important that the assembly not permit large quantities of leaves to flow with water along the gutter floor around the sides of the rib assembly and into the opening 28 so as to close off the downspout and thus allow water to pool in and overflow the gutter sidewall 20.

The plate 26 and beam member 32 may be constructed of any suitable, preferably rust resistant material such as, for example, aluminum, galvanized sheet metal and plastic. The ribs 30 should be constructed of relatively heavy gage rust resistant wires so as to be rigid yet bendable by hand to make such minor adjustments as may be necessary to fit into a gutter that is dented or otherwise slightly deformed in the region of the downspout 12. In the alternative, the ribs 30 can be constructed of elongated, flat rectangular strips of plastic, aluminum, galvanized sheet metal, or other suitable material.

Although the present invention has been described with respect to specific details of a certain preferred embodiment thereof, it is not intended that such details limit the scope of this patent other than as specifically set forth in the following claims.

I claim:

1. A leaf guard and strainer assembly for a gutter downspout comprising
   a base plate defining an opening therein, said base plate being adapted for disposition upon a floor of a gutter over an entrance to a downspout such that said opening registers with said entrance,
   a plurality of spaced apart, generally U-shaped ribs, each of said ribs having a pair of legs inserted through edge portions of said base plate on opposite sides of said opening, lower free end portions of said legs which project below said base plate being insertable into said entrance on opposite interior sides of said downspout such that planes containing each of said ribs face opposing sidewalls of said gutter, and
   a rigid beam member connected to upper apex portions of said ribs for maintaining a selected spacing between said ribs, one end of said beam being adapted to be inserted immediately under an inwardly projecting lip of an outer wall of said gutter and said member extends between opposing gutter sidewalls.

2. The leaf guard and strainer assembly of claim 1 wherein said base plate opening is rectangularly shaped.

3. The leaf guard and strainer assembly of claim 1 wherein said base plate opening is rectangularly shaped., said leaf guard and strainer further comprising a pair of flaps depending from and projecting below opposite sides of said opening.

4. The leaf guard and strainer assembly of claim 1 wherein said base plate opening is rectangularly shaped, said leaf guard and strainer further comprising a pair of rectangularly shaped flaps depending from opposite sides of said opening and projecting diagonally below said plate toward each other.

5. The leaf guard and strainer assembly of claim 1 wherein said pluraliy is four.

6. The leaf guard and strainer assembly of claim 1 wherein said ribs are tilted with respect to one another.

7. The leaf guard and strainer assembly of claim 1 wherein said base plate is rectangularly shaped.

8. The leaf guard and strainer assembly of claim 1 wherein said ribs comprise rigid, yet bendable, wires.

9. A leaf guard and strainer assembly for a downspout comprising
   a base plate defining an opening therein, said base plate being adapted for disposition upon a floor of a gutter over an entrance to a downspout such that said opening registers with said entrance,
   a plurality of spaced apart, U-shaped ribs, each of said ribs having a pair of legs inserted through edge portions of said base on opposite sides of said opening, and
   a rigid beam connected to upper apex portions of said ribs for maintaining a selected spacing between said ribs, one end of said beam being adapted to, be inserted immediately under an inwardly projecting lip of an outer wall of said gutter and extend between opposing gutter walls such that said legs of said ribs form a barrier to the flow of leaves and debris along the floor of said gutter into said downspout while allowing liquid in said gutter to flow around the side of leaves and debris stacked against said barrier and through said opening opposite the walls of said gutter and into said downspout.

* * * * *